Nov. 21, 1967 W. M. ADAMSON ET AL 3,353,643
SHAFT STOPPING DEVICE
Filed Feb. 2, 1966 2 Sheets-Sheet 1

INVENTORS
WILLIAM M. ADAMSON
NORMAN B. NEWTON
BY *Norman Freedland*
ATTORNEY

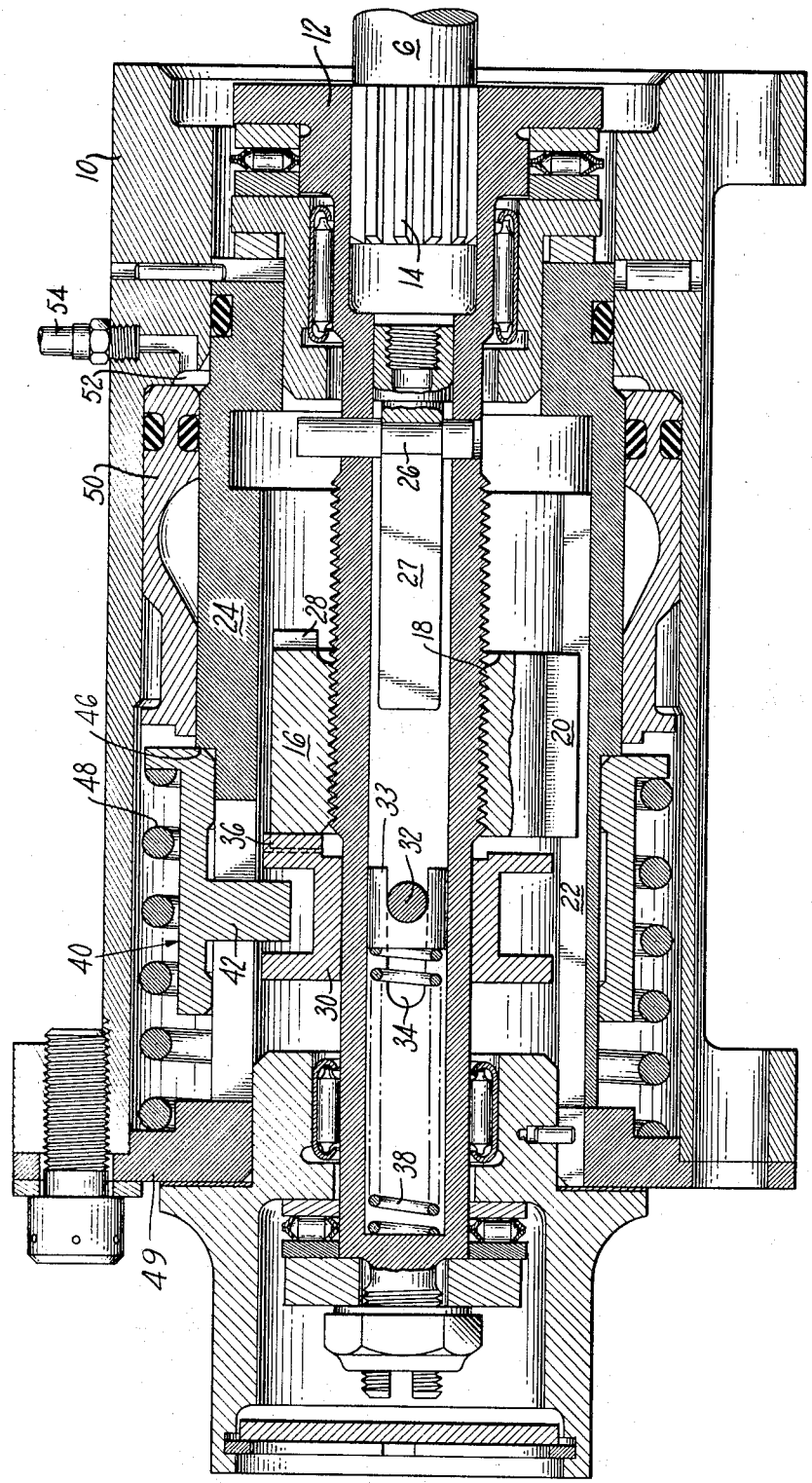

United States Patent Office 3,353,643
Patented Nov. 21, 1967

3,353,643
SHAFT STOPPING DEVICE
William M. Adamson, East Granby, and Norman B. Newton, South Glastonbury, Conn., assignors to United Aircraft Corporation, East Hartford, Conn., a corporation of Delaware
Filed Feb. 2, 1966, Ser. No. 524,380
3 Claims. (Cl. 192—141)

This invention relates to devices for limiting the number of revolutions of a shaft and particularly to devices of this type in which the allowable number of shaft revolutions can be adjusted in response to a control signal while the shaft is turning.

The substance of our invention lies in providing an axially-movable rotating tangential stop between a rotating threaded shaft and a threaded translating member mounted on the shaft.

It is an object of this invention to provide a device for limiting the number of revolutions of a shaft.

It is a further object of this invention to provide a device for changing the limits on the number of revolutions of a shaft to preselected values in response to a control signal.

FIGURE 2 is a representation of a shaft stopping device for the pitch control linkage shown in FIGURE 1.

Figure 1:
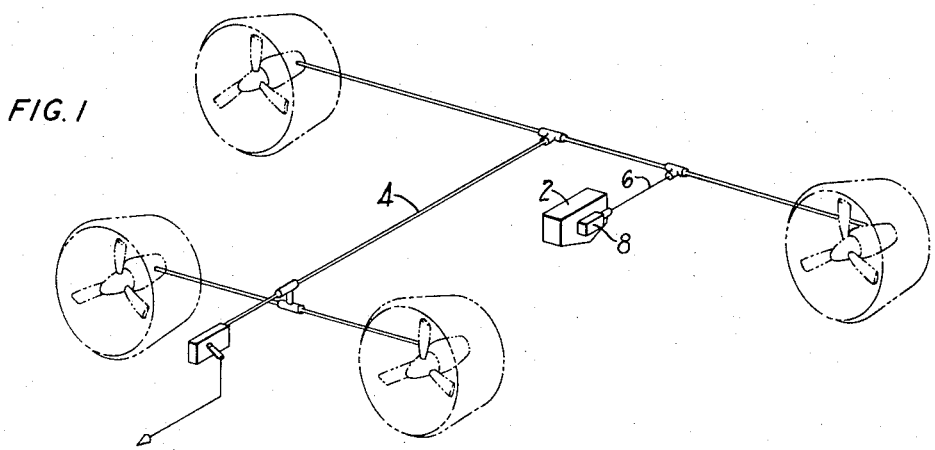
FIGURE 1 is a schematic representation of a pitch control linkage for an aircraft propeller system in which the propeller drives are connected by common shafting.

Referring to the drawings, FIGURE 1 is a schematic of the pitch control linkage of a ducted-propeller system for a vertical takeoff and landing aircraft in which four propellers are driven by a common power shaft system. A master control 2 provides a rotary pitch control signal to a shafting system generally indicated by numeral 4 for transmission to the four propellers. At the propellers the rotary signal is converted to a blade pitch angle change by means of a linkage system and servo control at each propeller, not shown.

By limiting the number of revolutions of the control output shaft 6 the blade angle pitch limits can effectively be controlled. This is accomplished by the shaft stopping device 8 which is shown in detail in FIGURE 2. The shaft stopping device controls the total number of revolutions of the pitch control shafting 4.

FIGURE 2 shows a housing 10 and a threaded shaft 12 rotatably mounted in the housing. The shaft 12 is coupled to the control output shaft 6 through spline 14. A translating member 16 is mounted on the shaft 12 through mating threads 18 and is constrained to move in an axial direction by a torque lug 20 which engages a slot 22 in a fixed sleeve 24. A pin 26 is fixed with respect to the shaft 12 so as to engage a lug 28 on the translating member 16 as it moves to the right. The pin 26 is held in position by a clothespin-shaped retainer 27.

A variable position stop 30 is slidably mounted on shaft 12. Pin 32 which moves in a slot 34 in shaft 12 constrains the stop 30 to rotate with shaft 12. A projection or lug 36 on the stop 30 is adapted to engage a corresponding projection on the left end of translating member 16 as it translates to the left. Spring 38, through seat 33, positions the pin and stop assembly to the right during normal operation.

The stop 30 can be repositioned to the left by means of a carriage 40 which engages the stop for axial movement through a projection 42. The carriage is normally spring loaded against a step 46 on sleeve 24 by spring 48. A piston 50 having an annular actuating chamber 52 at its right end is designed to move the carriage to the left when hydraulic pressure is applied to the chamber 52 through line 54.

During operation the translating member 16 will move to the right as the pitch control output shaft turns in a direction to increase pitch. The location of the pin 26 determines the maximum pitch the blades can go to by limiting the number of shaft revolutions in the increasing pitch direction. As the translating member moves to the right the lug 28 will move into the patch of the rotating pin 26 and will cause the shaft 12 to stop when the pin contacts the lug 28. The relative rotation of the shaft with respect to the nut is stopped by a tangential force which is transmitted through the torque lug 20 to the fixed sleeve 24.

When the shafting moves in the decreasing pitch direction the translating member will move toward the left and will eventually engage the low pitch stop 30 in a manner similar to the engagement of the high pitch pin stop. When a lower low pitch stop is required, such as during ground handling of the aircraft, hydraulic pressure is applied to chamber 52 through line 54. The piston moves to the left and causes the carriage 40 to move against the spring 48 until the carriage bottoms against the bulkhead 49. The projection 42 on the carriage carries the stop 30 to the left against the spring 38 to a new left-hand position determined by the position of the carriage against the housing. In this position, the low pitch stop will function in exactly the same manner as before except that it will now allow more shaft revolutions between the high pitch position and the low pitch position.

When the lower low pitch stop is no longer required, hydraulic pressure is removed from the piston and the springs force the carriage and low pitch stop to the right toward their original positions. If the translating member is to the left of the original low pitch stop position when the pressure is released, the low pitch stop 30 will move against translating member under the action of the spring and will ratchet against the translating member and follow its movement in the high pitch direction until the stop reaches its original position.

Figure 3:
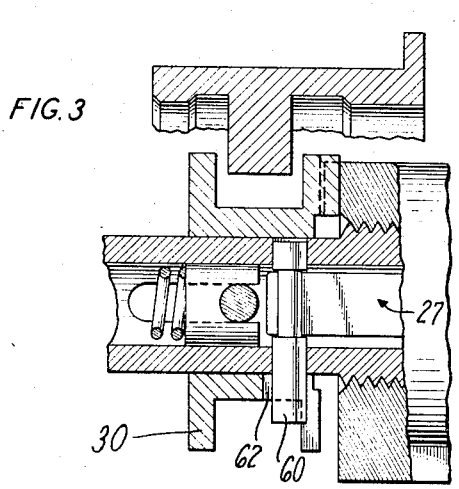
FIGURE 3 shows a modification of the device shown in FIGURE 2.

FIGURE 3 shows another embodiment of our invention. Instead of using the same stop in both the normal position and retracted position, a fixed stop can be used in conjunction with a retractable normal stop to provide the same effect. In this embodiment a second pin 60 is attached to the shaft by a modified retainer 27. The normal stop contains a slot 62 which allows the pin 60 to be covered during normal operation. When the stop 30 is retracted the pin 60 is exposed and will act as a stop in exactly the same manner as the high pitch stop described above. In this embodiment the retracted position of the normal stop is not critical since it is not operative as a stop in this position and the location of the pin determines the maximum shaft revolutions.

Although only one of the stops in the devices described is movable, it will be obvious to those skilled in the art that both high and low pitch stops could be made retractable, thus providing a larger selection of limits on the shaft revolutions.

Although we have shown only a single carriage and piston for retracting the low pitch stop a plurality of carriage-pistons combinations can be arranged to operate on the same retractable stop so as to provide several different retracted positions thus increasing the possible number of shaft revolutions which can be selected.

We claim as our invention:
1. A mechanical shaft stopping device comprising:
   a housing;
   a threaded shaft rotatably mounted in said housing;
   means for connecting said shaft to a rotary input;

a translating member threadedly mounted on said shaft, said translating member having a projecting portion extending parallel to said shaft;

means on said housing for preventing rotation of said translating member;

a stop on said shaft having projecting portion designed to engage a projection on said translating member for stopping the shaft when the translating member moves into the rotary path of the stop, said stop being axially slidable on said shaft; and means for changing the axial position of said stop on said shaft in response to a control signal.

2. A mechanical shaft stopping device comprising:

a housing;

a threaded shaft rotatably mounted in said housing;

means for connecting said shaft to a rotary input;

a translating member threadedly mounted on said shaft, said translating member having a projecting portion extending parallel to said shaft;

means on said housing for preventing rotation of said translating member;

a stop on said shaft having a projecting portion designed to engage a projection on said translating member for stopping the shaft when the translating member moves into the rotary path of the stop, said stop being movable between two axial positions on said shaft;

means for urging said stop toward one of the axial positions on said shaft; and means for moving said stop to the second position on said shaft.

3. A mechanical shaft stopping device as recited in claim 2 in which the means for moving said stop to the second position on said shaft comprises:

a source of fluid under pressure;

a piston adapted to translate said stop; and means responsive to a control signal for regulating the flow of fluid from said source to said piston.

No references cited.

FRED C. MATTERN, JR., *Primary Examiner.*

F. D. SHOEMAKER, *Assistant Examiner.*